Jan. 25, 1949.  S. S. STINE  2,459,850
TURBINE APPARATUS
Filed Dec. 10, 1945
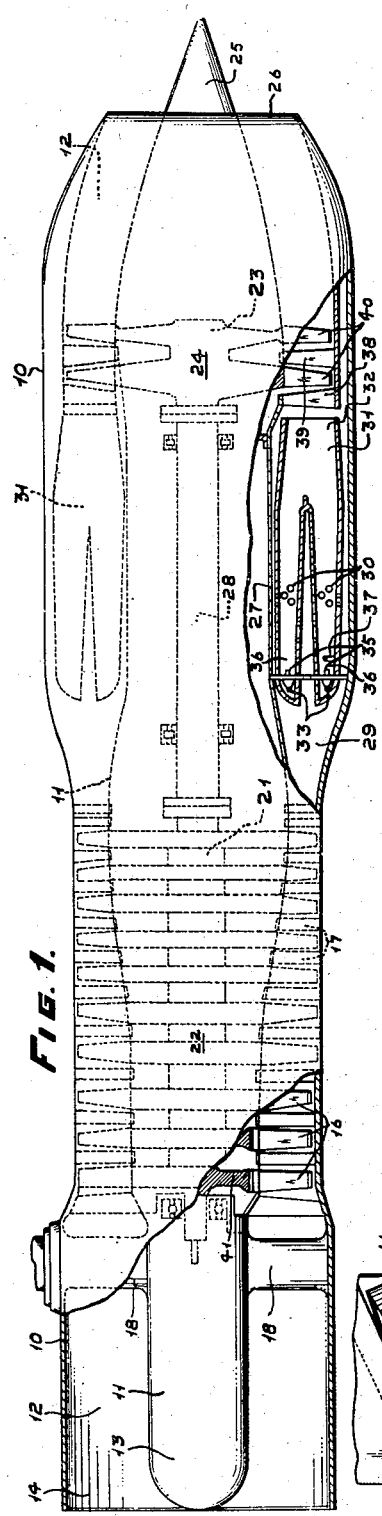
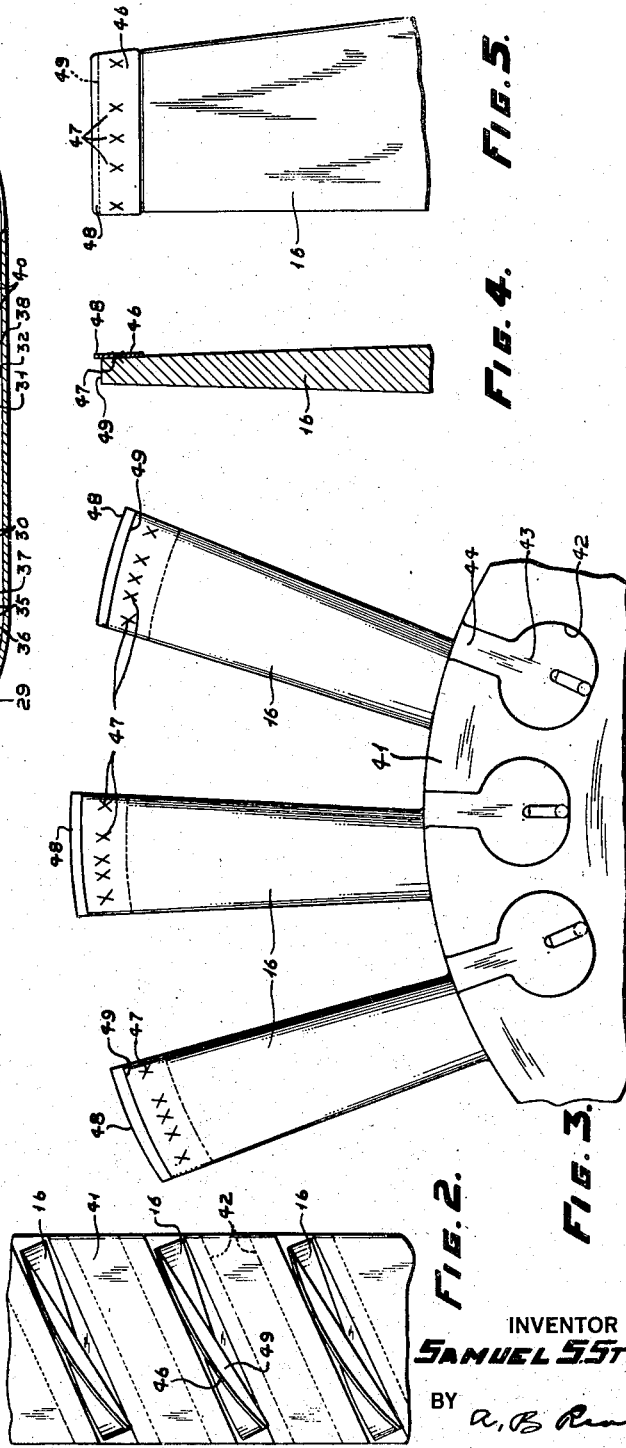
INVENTOR
SAMUEL S. STINE
BY
ATTORNEY

Patented Jan. 25, 1949

2,459,850

UNITED STATES PATENT OFFICE 2,459,850

TURBINE APPARATUS

Samuel S. Stine, Lansdowne, Pa., assignor to Westinghouse Electric Corporation, East Pittsburgh, Pa., a corporation of Pennsylvania Application December 10, 1945, Serial No. 634,012

1 Claim. (Cl. 253—77)

This invention relates to blading, more particularly to blading for use in elastic fluid utilizing apparatus, and has for an object to provide improved apparatus of this character.

Another object of the invention is to provide an improved tip construction for blading of elastic fluid utilizing apparatus, which blading is provided with relatively thin tip constructions producing improved sealing action with respect to adjacent parts with which they have relative motion.

The present invention, while not limited thereto, is adapted to be used with blading of a gas turbine power plant similar to that disclosed in the copending application of Stewart Way, Serial No. 482,533, filed April 10, 1943 and assigned to the assignee of the present invention (Patent No. 2,405,723, August 13, 1946). A power plant of the type disclosed in the mentioned Way application includes an axial-flow air compressor, air heating apparatus, a gas turbine, and a propulsion jet nozzle, all housed in line within a streamlined tubular casing. A plant of this character is particularly suitable for propelling aircraft at high speeds and operates generally as follows: Air enters the forward end of the tubular casing, which is pointed in the direction of flight, and is compressed in the compressor, the compressed air then being heated in the heating apparatus by the combustion of fuel supported by the compressed air. The resulting motive fluid, comprising the products of combustion and the excess compressed air, drives the turbine and is then discharged through the propulsion nozzle as a jet, the reaction of which serves to propel the aircraft. The turbine extracts at least sufficient power from the motive fluid to drive the compressor and its auxiliaries.

Therefore, yet another object of the invention is to provide, in aircraft apparatus including a bladed compressor and a bladed turbine, novel blade construction for said compressor and/or turbine.

These and other objects are effected by the invention as will be apparent from the following description and claims taken in connection with the accompanying drawings, forming a part of this application, in which:

Fig. 1 is a side elevational view of a gas turbine power plant incorporating the present invention, a portion of the outer casing structure being broken away to show certain details of construction;

Fig. 2 is an enlarged, fragmentary plan view of a portion of a compressor blade row shown in Fig. 1;

Fig. 3 is a side elevational view of the fragmentary construction shown in Fig. 2;

Fig. 4 is a vertical sectional view through one of the blades shown in Fig. 3; and, Fig. 5 is a side elevational view of the blade shown in section in Fig. 4.

The power plant shown in Fig. 1 comprises, in general, an outer tubular casing structure 10, open from end to end and having a central core 11 providing, with the casing, an annular flow passage 12, which, if the plant is to be used for propelling an aircraft, is adapted to extend fore and aft with respect to said aircraft. The central core structure 11 is supported by the outer casing structure along its longitudinal axis and includes a hollow fairing cone 13, defining with the forward or left end of the casing 10, as viewed in Fig. 1, an air inlet 14, and is supported from the casing 10 by hollow compressor guide vanes 18.

The core 11 also includes the rotor 21 of an axial-flow compressor 22, the fixed blades 17 of which are carried by the casing 10, the rotor 23 of a gas turbine 24, and a longitudinally adjustable conical tailpiece 25 which defines, with the rear end of the casing 10, an adjustable propulsion nozzle 26.

The intermediate portion of the core structure between the compressor 22 and the turbine 24 comprises an inner tubular wall structure 27 which houses a shaft 28 serving to connect the turbine rotor 23 and the compressor rotor 21. The inner wall structure 27 defines, with the casing 10, an annular chamber 29 connecting the compressor blade passage and the turbine blade passage.

This chamber 29 is provided with suitable means for heating the air compressed by the compressor 22. In the embodiment shown, an annular burner tube of double conical section and provided with numerous perforations 30 for the admission thereto of air, is mounted in the annular chamber 29 with its larger open end 32 directed downstream. Fuel is supplied to the burner tube 31 from a pair of manifolds 33, connected to a fuel supply (not shown) and is fed to atomizing nozzles 35 extending into the burner tube at spaced points about the periphery thereof adjacent the apexes 36. Suitable means, including spark plugs 37 extending into the burner tube, is provided for igniting the air fuel mixture in the tube.

The present invention is concerned with the specific design of the compressor blades 16 and 17 and/or the turbine blades 39 and 40, and not with the details of the remaining apparatus referred to thus far, although such remaining apparatus is preferably constructed in accordance with the disclosure of the above-mentioned Way application.

The power plant operates substantially as follows: Air enters the casing 10 at the inlet 14, is compressed during passage through the compressor 22, and flows into the annular chamber 29 whose diverging inlet portion may function as a diffuser to effect further compression. The compressed air then passes through the openings 30 in the walls of the double conical burner tube 31 and mixes with the atomized fuel supplied thereto by the nozzles 35. The air and fuel mixture is ignited by the spark plugs 37 and burns steadily thereafter. The motive fluid, comprising the products of combustion and the excess air, flows from the burner tube 31 through its enlarged discharge end 32 and is directed by fixed guide vanes 38 into the blade passage of the turbine rotor 23. The turbine 24 extracts at least sufficient energy from the motive fluid to drive the compressor 22 and other auxiliary apparatus (not shown). The spent gases leaving the turbine are discharged through the propulsion nozzle 26 at a high velocity so that the remaining energy in the motive fluid is available to propel the aircraft. Preferably, the tailpiece 25 is axially movable with respect to the casing 10, so that the back pressure on the turbine and the jet effect produced by the nozzle may be varied.

Referring now to Figs. 2 to 5, inclusive, for details of the present improvement, there is shown in Figs. 2 and 3 a portion of a compressor disc 41 having a circumferential series of grooves 42 extending generally transversely thereof and opening outwardly through the periphery of the disc. Blades 16 are secured to the disc 41 by root structures whose bulbous portions 43 fit in the transverse grooves 42, the bulbous portions 43 being connected by neck portions 44 with the blades proper 16. As best shown in Figs. 4 and 5, the outer end of each blade 16 has secured thereto, in any suitable manner, for example, by brazing or spot welding, a thin piece of metal 46. While, as indicated, any suitable means may be employed for securing these pieces 46 to the free ends of the blades, it has been found preferable to rely upon spot welding, as at 47, inasmuch as this mode of fastening permits replacement of these thin metal pieces without removal of the blades from the rotor.

As best shown in Figs. 3 and 4, the thin pieces of metal 46 are so positioned with respect to the free ends of the blades 16 that they extend therebeyond a short distance, as at 48. The outer tips 40 of the blades proper are preferably spaced several thousandths of an inch from the adjacent outer casing 10 in order to provide suitable clearance to take care of expansion and contraction effects resulting from temperature changes in the structure, inasmuch as rubbing of the blades 16, when moving at high peripheral speeds, would, in a short time, cause serious damage and probable wreckage of the apparatus. However, as is well known in the blading art, it is desirable to have the tips of the blades positioned as close as possible to the adjacent part and, to this end, the thin pieces 46 project beyond the ends 40 of the blades 16 and may, under certain circumstances, actually contact the adjacent stationary casing 10. However, these pieces 46 are preferably of a material having good rubbing characteristics, whereby they quickly wear away upon contact with the casing 10 and automatically adjust their clearance to that necessary to prevent rubbing.

While applicant is aware that blade tips have been provided with thin extensions adapted to wear and automatically provide suitable clearance, as for example, in Patent No. 1,828,409 to B. V. Densmore, and assigned to applicant's assignee, such prior art tips have been formed integral with the blade proper, which forming is a difficult operation and not too satisfactory at best. Furthermore, the material which is normally suitable for blades, is not the best so far as rubbing characteristics are concerned, whereas, with applicant's arrangement, it is not only possible to obtain a mechanically perfect thin projection, but this projection may be of the most desirable material as regards rubbing characteristics and, at the same time, the blade to which it is attached may be of that material which is preferred for blades of the character involved. For example, the blade material for a high speed compressor might be a low carbon 12% chrome steel, whereas the material of the thin strip 46 might be the same steel except for the addition thereto of molybdenum, which steel has exceptionally good rubbing characteristics.

While I have shown the invention in but one form, it will be obvious to those skilled in the art that it is not so limited, but is susceptible of various changes and modifications without departing from the spirit thereof.

What is claimed is:

In an axial flow turbine or compressor: a rotor and a stator; a circumferential row of radially-extending blades carried by the rotor with their tips adjacent, but spaced slightly from, the stator; and a thin strip of metal secured to one side of each of said blades near the tip thereof and projecting therebeyond toward the stator with its projecting edge conforming to the shape of the opposed portion of the stator, said thin strips of metal having good rubbing characteristics, and said strips being secured to the blades by spot welding, whereby they may be removed and replaced while the blades are mounted on the rotor.

SAMUEL S. STINE.

REFERENCES CITED

The following references are of record in the file of this patent:

UNITED STATES PATENTS

| Number | Name | Date |
| --- | --- | --- |
| 899,319 | Parsons et al. | Sept. 22, 1908 |
| 953,674 | Westinghouse | Mar. 29, 1910 |
| 1,187,448 | De Wein | June 13, 1916 |
| 1,686,840 | Richard | Oct. 9, 1928 |
| 1,999,711 | Zetterquist | Apr. 30, 1935 |
| 2,020,986 | Anoschenko | Nov. 12, 1935 |
| 2,314,289 | Salisbury | Mar. 16, 1943 |
| 2,350,310 | Dahlstrand | May 30, 1944 |